(12) United States Patent
Fleming et al.

(10) Patent No.: US 7,444,759 B1  
(45) Date of Patent: Nov. 4, 2008

(54) ROLLABLE BEAM MEASUREMENT APPARATUS

(76) Inventors: Heather Fleming, 460 Fernando Ave., Palo Alto, CA (US) 94306; David Titzler, 425 Maureen Ave., Palo Alto, CA (US) 94306; Brian Lamb, 228 O'Connor St., Menlo Park, CA (US) 94025; William Anderson, 23652 Skyview Ter., Los Gatos, CA (US) 95033

( * ) Notice: Subject to any disclaimer, the term of this patent is extended or adjusted under 35 U.S.C. 154(b) by 0 days.

(21) Appl. No.: 11/556,465

(22) Filed: Nov. 3, 2006

Related U.S. Application Data

(60) Provisional application No. 60/733,896, filed on Nov. 4, 2005.

(51) Int. Cl.  
*G01B 3/10* (2006.01)

(52) U.S. Cl. ............................................ 33/771; 33/755

(58) Field of Classification Search .................. 33/755, 33/757, 760, 764, 771  
See application file for complete search history.

(56) References Cited

U.S. PATENT DOCUMENTS

| | | | | |
|---|---|---|---|---|
| 2,319,724 A | * | 5/1943 | Dinhofer | ...................... 33/757 |
| 4,275,503 A | * | 6/1981 | Bergkvist | ...................... 33/757 |
| 6,145,210 A | * | 11/2000 | Walczynski | ................... 33/458 |
| 6,898,866 B2 | * | 5/2005 | Weeks | .......................... 33/771 |
| 7,062,862 B2 | * | 6/2006 | Wheaton | ...................... 33/757 |
| 2005/0183279 A1 | * | 8/2005 | Wheaton | ...................... 33/755 |
| 2006/0000104 A1 | * | 1/2006 | Patton | .......................... 33/755 |

* cited by examiner

*Primary Examiner*—G. Bradley Bennett

(57) ABSTRACT

A rollable beam measurement apparatus is disclosed. In one embodiment, the apparatus includes a housing including a reel. A rule having a leading edge and a trailing edge is provided and the trailing edge is attached to the reel. An end hook is attached to the leading edge. In preferred embodiments, the rule comprises a pair of opposing rules forming a tubular structure. This new tape rule eliminates the typically unstable and flexible behavior of typical tape rules, providing the ability for stiffness and standout length in all orientations and in all environmental conditions. Furthermore, this invention improves the readability of the tape rule markings as well as maintains the accepted standard for tape rule stowage while providing these benefits.

2 Claims, 4 Drawing Sheets

ROLLABLE BEAM MEASUREMENT APPARATUS

CROSS REFERENCE TO RELATED APPLICATIONS

This application claims priority to Provisional Application Ser. No. 60/733,896, filed on Nov. 4, 2005.

FIELD OF THE DISCLOSURE

The present disclosure relates generally to measurement tools, and in particular to tape measures.

BACKGROUND

The ideal tape rule would be perfectly flat and yet not suffer from bending or folding when in the cantilevered position. Yet the tape rule of all tape measures loses rigidity after being extended to some length. To increase the rigidity of tape rules, tape rules of the prior art opt for either a wider tape rule or a deeper curve in the profile of the tape rule. However, a deeper profile in the tape rule results in difficulty in marking measurements on the surface being measured as the edges of the tape rule tend to curve up and away from the surface being measured. This results in the user having to tilt the tape in order to accurately mark a desired measurement.

DETAILED DESCRIPTION

Embodiments of the present invention described in the following detailed description are directed at tape rules. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
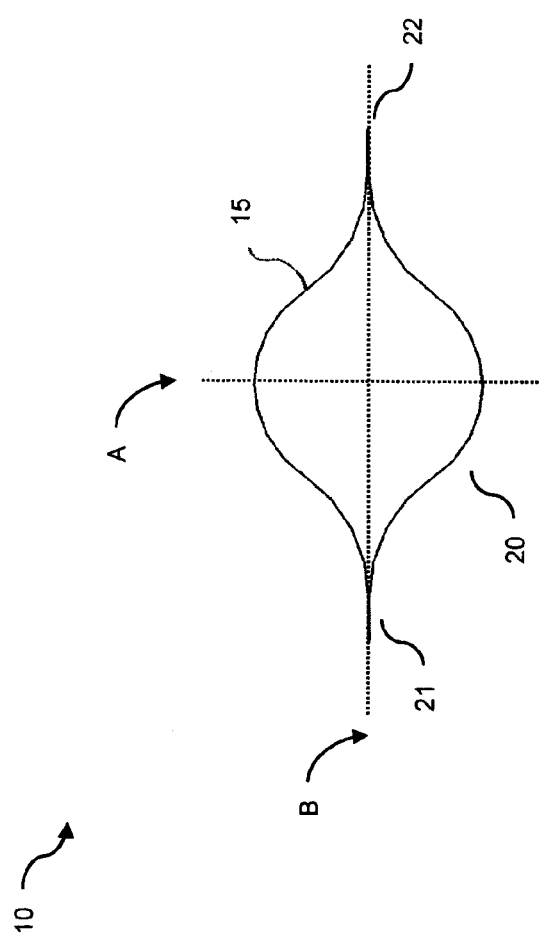
FIGS. 1 and 4 are cross-sectional diagrams of a tape rule in accordance with the teachings of this disclosure.

FIG. 1 shows a cross section of a tape rule section 10 configured in accordance with the teachings of this disclosure. The tape rule assembly 10 is comprised of two opposing metal tape rules 15 and 20 forming a tube or hollow structure. The outer surface may be marked with measurement indicia as is known in the art.

In preferred embodiments, the constituent tape rules 15 and 20 may comprise opposing shapes to improve the cantilever characteristics of the tape rule when extended. In one preferred embodiment, the shapes of the rules 15 and 20 may comprise a mixed concave-convex shape connected at peripheral planar interfaces 21 and 22 defining a plane B. In such an embodiment, the rules 15 and 20 comprise a concave shape proximate to axis A, and gradually transition to a convex shape proximate to edges 21 and 22.

Figure 4:
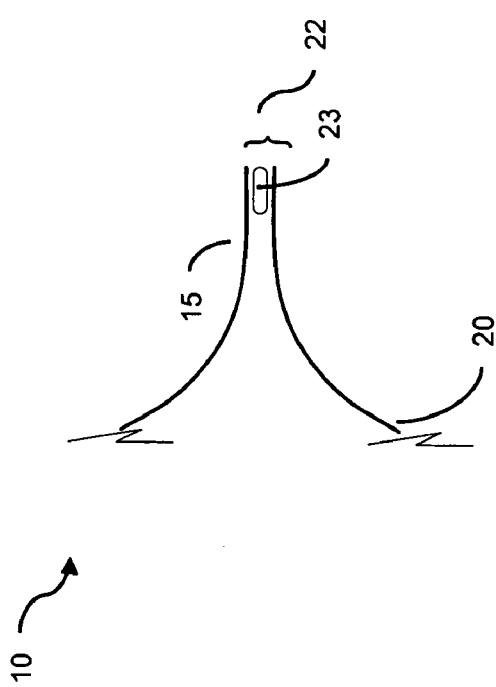

The rules 15 and 20 are affixed to each other at edges 21 and 22 through means such as by continuous laser welding, resistance welding or similar fixing method. Alternatively, adhesive means such as continuous adhesive application or discrete laser, resistance or similar welding operations may be employed. Alternatively one rule may be bent at its edges to overlap and capture the other rule. Alternatively an elastomeric element 23 may be placed between rules 15 and 20 to provide a flexible bridging bond between the two elements as shown in FIG. 4.

Figure 2:
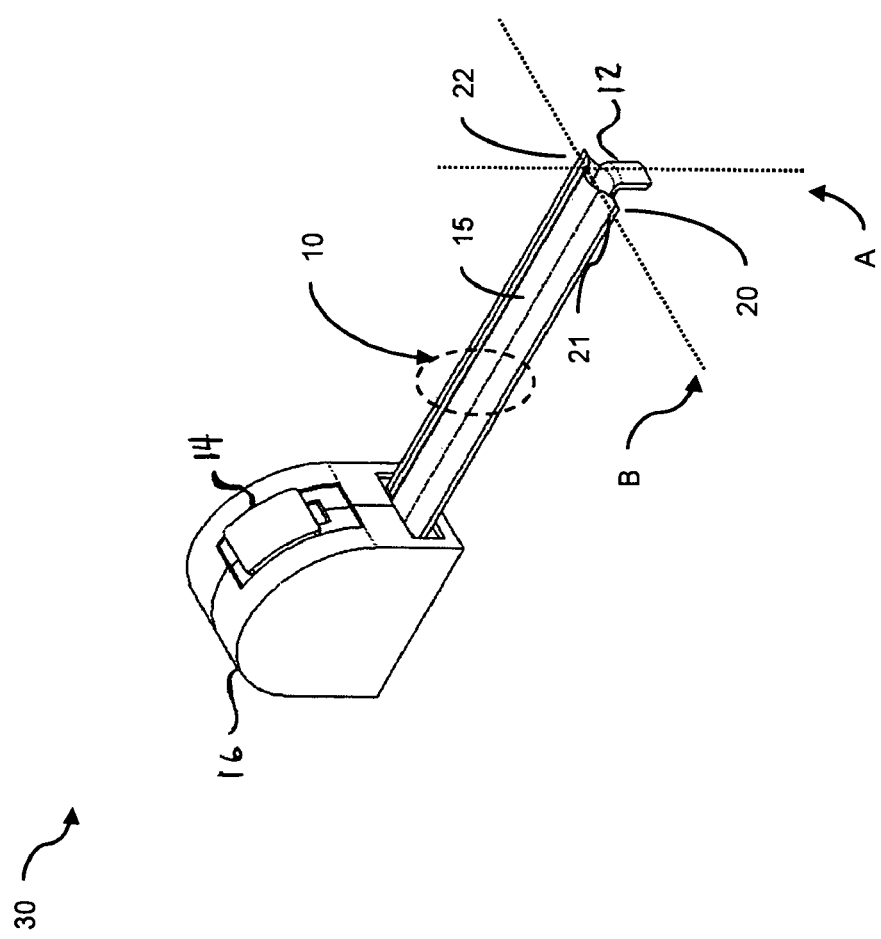
FIG. 2 is a isometric view of a tape rule assembly in accordance with the teachings of this disclosure.

FIG. 2 shows an isometric view of a tape rule assembly 30. The assembly 30 includes an end hook 12 attached to the tape rule section 10. The assembly 30 further comprises a housing assembly 16 shown at the opposite tape rule section end from the hook 12. The housing 16 includes a user actuate-able locking mechanism 14 as is known in the art.

Figure 3:
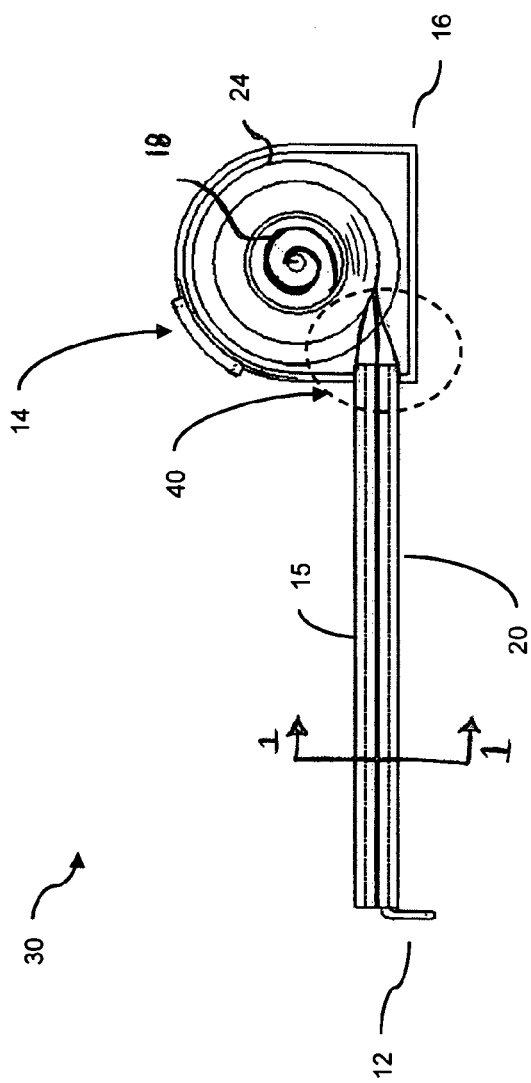
FIG. 3 is a section view of a tape rule assembly in accordance with the teachings of this disclosure.

FIG. 3 is a section view of the tape rule assembly 30 showing the housing 16 connected to a wound flat spring 18, which in turn is connected to a reel 24 so as to provide a retracting bias upon the reel as is known in the art. The tape rule 10 may be mounted on the reel 24 in a flat, rolled state. FIG. 3 also shows a section 1 from which the tape rule section of FIG. 1 may be derived.

In operation, the tape rule 10 is extended away from the body for general tasks. The closed tape section expands perpendicularly to the extension path in region 40 to increase the section height oriented in parallel to loading forces, thus increasing the rule stiffness and standout and decreasing sag. In addition, the continuously welded lateral interfaces at edges 21 and 22 resist buckling for further increased stiffness and standout. When extending the tape rule in alternative orientations or conditions, the closed tape rule section provides rigidity where standard rules of the prior art are flexible and unstable. The closed tape rule section can have comparable, or in some cases, increased stiffness and standout performance relative to when tape rule assembly is extended in the usual manner.

The extended rule assembly improves marking readability by presenting a convex surface to the user as opposed to the typical concave surface. The tape rule is retracted in the usual manner and the closed section is induced to collapse by rolling around the reel. The collapse is achieved with isolated bending in each mixed concave-convex sections of the tape rule assembly in the region 40.

It is contemplated that other configurations are possible, including alternative box stowage means that allows folded layers of similar or opposite direction to nest. Alternative tape rule assemblies include two concavo-convex sections joined at outer edges as described herein, or two concavo-convex sections wrapped in flexible sleeve rather than being fastened at the edges. Also, the tape rule may be formed from one continuous closed section in an extruded-like fashion.

It is also contemplated that the thickness, width or height may be variable for opposing sections. Also, the radii of the tape rules may be varied, and concavo-convex sections can be assembled from any desired number of mixed concave or convex sections. The tape rule may also be comprised from alternate tape rule materials or a combination of materials such as polymers, fiber reinforced polymers or elastomeric materials.

As will now be appreciated, a new, improved tape rule has been described that increases the stiffness and standout length and reduces sag of typically tape rules. In addition, this new tape rule eliminates the typically unstable and flexible behavior of typical tape rules, providing the ability for stiffness and standout length in all orientations and in all environmental conditions. Furthermore, this invention improves the readability of the tape rule markings as well as maintains the accepted standard for tape rule stowage while providing these benefits. Our invention accomplishes these improvements by creating a symmetric, closed section extendable tape rule.

While embodiments and applications of this invention have been shown and described, it will now be apparent to those skilled in the art having the benefit of this disclosure that many more modifications than mentioned above are possible without departing from the inventive concepts disclosed herein.

We claim:

1. A rollable beam measurement apparatus comprising:
a housing including a reel;
a rule having a leading edge and a trailing edge;
said trailing edge attached to said reel;
an end hook attached to said leading edge; and
wherein said rule comprises a pair of opposing rules forming a tubular structure including an elastomeric element placed between said opposing rules to provide a flexible bridging bond between said opposing rules.

2. The rollable beam measurement apparatus of claim 1, further comprising wherein one rule is bent at its edges to overlap and capture the other rule.

\* \* \* \* \*